US012718436B2

(12) United States Patent
Getsch

(10) Patent No.: US 12,718,436 B2
(45) Date of Patent: Aug. 25, 2026

(54) IMAGE STITCHING

(71) Applicant: Check Out My, LLC, Redmond, WA (US)

(72) Inventor: Timothy E. Getsch, Tacoma, WA (US)

(73) Assignee: Check Out My, LLC, Redmond, WA (US)

( * ) Notice: Subject to any disclaimer, the term of this patent is extended or adjusted under 35 U.S.C. 154(b) by 288 days.

(21) Appl. No.: 18/483,376

(22) Filed: Oct. 9, 2023

(65) Prior Publication Data

US 2025/0117881 A1 Apr. 10, 2025

(51) Int. Cl.
*G06T 3/4038* (2024.01)

(52) U.S. Cl.
CPC .................................. *G06T 3/4038* (2013.01)

(58) Field of Classification Search
CPC .............................. G06T 3/4038; G06T 11/60
See application file for complete search history.

(56) References Cited

U.S. PATENT DOCUMENTS 7,924,314 B2 4/2011 Getsch
2007/0186164 A1* 8/2007 Getsch ............... H04N 1/32101 715/723
2010/0223568 A1* 9/2010 Quek ...................... G06T 11/60 715/765
2018/0241919 A1* 8/2018 Bell ........................ G03B 17/17
2021/0303897 A1* 9/2021 Kelly .................. G07F 17/3227
2023/0128420 A1* 4/2023 Azevedo ............... G06T 3/4038 382/100

OTHER PUBLICATIONS

John Reichard Enterprises. (2018). Features. Sportscard Organizer. https://sportscardorganizer.com/features.htm (Year: 2018).*

* cited by examiner

*Primary Examiner* — Stephen R Koziol
*Assistant Examiner* — Ashley Hytrek
(74) *Attorney, Agent, or Firm* — Schwabe, Williamson & Wyatt, P.C.

(57) ABSTRACT

Embodiments herein relate to systems, apparatuses, or processes for identifying a plurality of images of a plurality of objects, for example one or more sides or “facets” of an object, and arranging at least a subset of the plurality of images in a 2D configuration that may be presented to a user for evaluation. Other embodiments may be described and/or claimed.

20 Claims, 10 Drawing Sheets

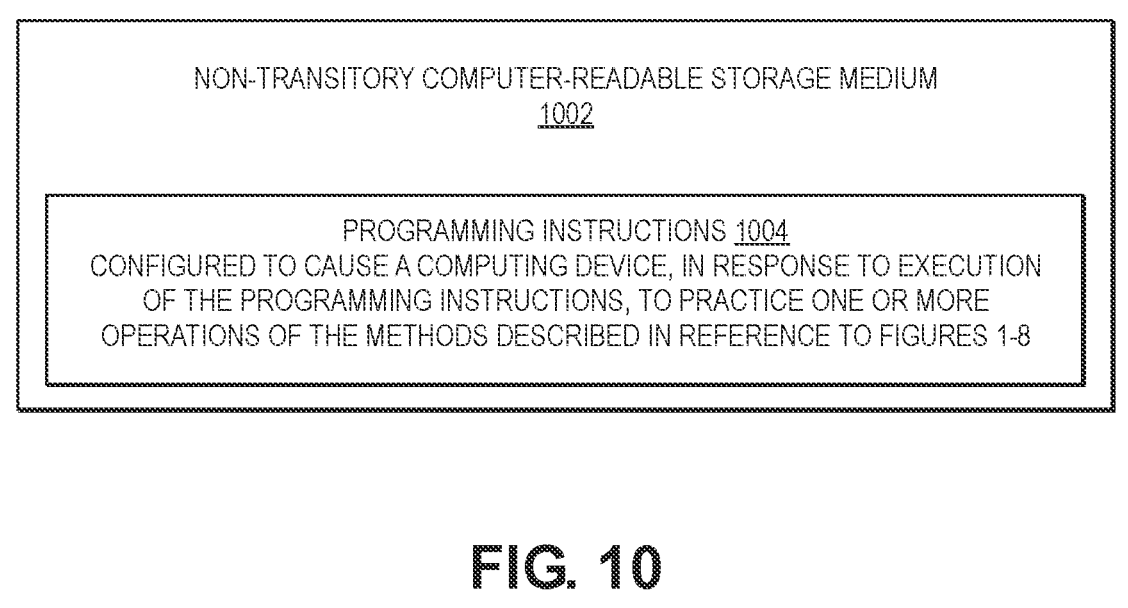

NON-TRANSITORY COMPUTER-READABLE STORAGE MEDIUM
1002

PROGRAMMING INSTRUCTIONS 1004
CONFIGURED TO CAUSE A COMPUTING DEVICE, IN RESPONSE TO EXECUTION OF THE PROGRAMMING INSTRUCTIONS, TO PRACTICE ONE OR MORE OPERATIONS OF THE METHODS DESCRIBED IN REFERENCE TO FIGURES 1-8

FIG. 10

IMAGE STITCHING

FIELD

Embodiments of the present disclosure generally relate to capturing image data of sides of multiple physical objects and configuring multiple graphical images of the captured image data.

BACKGROUND

The market continues to grow in physical collector items, such as sports cards, stamps, coins, photographs, photo slides, postcards, stickers, magazines, comic books, comic cards, playing cards, trading cards, gaming cards, "pogs," and the like that may have various sides, or facets, that are captured in a digital image format.

BRIEF DESCRIPTION OF THE DRAWINGS

FIG. 10 illustrates an example non-transitory computer-readable storage media having instructions configured to practice all or selected ones of the operations associated with the processes described herein.

DETAILED DESCRIPTION

Figure 1:
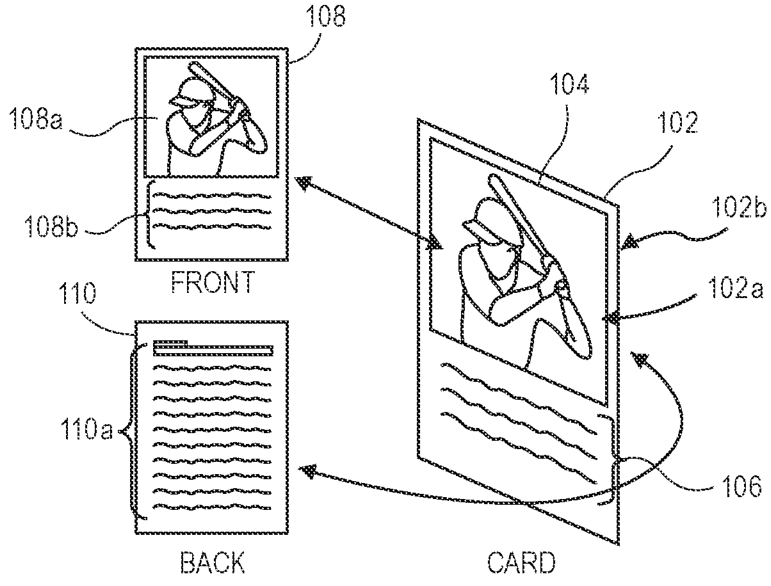
FIG. 1 illustrates various sides, or facets, of a physical object in the form of a baseball card that may be captured and stored as digital data, in accordance with various embodiments.

Embodiments of the present disclosure may generally relate to systems, apparatus, techniques and/or processes directed to identifying a plurality of images of sides, or facets, of a physical object and combining, or "stitching" at least a portion of the plurality of images into a single image. This single image may be referred to as a stitched image. The resulting stitched image may be stored as a graphical image and may be printed. In embodiments, the single image may be displayed on computer display or a tablet display.

In embodiments, physical objects may be collectible items, for example sports cards, stamps, coins, photographs, photo slides, postcards, stickers, magazines, comic books, comic cards, playing cards, trading cards, gaming cards, "pogs," and the like. Frequently, these physical objects may be stored as collections, for example but not limited to multiple volumes of books having individual pages, where a page may include multiple locations, for example multiple pouches, into which one or more of the respective collectible items may be placed. In this way, an inventory of physical objects may be maintained. It should also be appreciated that the physical objects may be inventoried and maintained other than in book form, for example within a drawer, on a shelf, in a box, or in a tray.

The physical objects may have been scanned or photographed such that one or more of the facets of the physical objects have been captured as images. For example, for a baseball card, images may be taken of a front side and a back side of the baseball card. In embodiments, one or more databases may include the captured images as well as information about the captured images, which may be referred to as metadata. The one or more databases may also include the physical location of the baseball card in a physical storage system. This physical location may include, for example but not limited to, a volume number of a plurality of volumes that may be in a warehouse, a page number within the volume, and a location identifier within a page. The one or more databases may also include inventory information, such as inventory levels of the baseball cards.

In embodiments, the stitched image may be created to represent what a particular physical page within a particular physical volume of baseball card inventory should look like. The stitched image may be created using the individual images of facets of a baseball card, physical location on the page of the baseball card, and inventory levels of the baseball card. In this way, an individual may be given a printout of a stitched image referring to a volume and a page number, and may go to the page and compare the stitched image to the page.

In some embodiments, the individual performing the comparison may be a picker, where one or more of the images within the stitched image are highlighted to indicate which card should be removed from the page for order fulfillment purposes. In other embodiments, the individual may be conducting an inventory count, and may want to compare the stitched image with the layout of the page to determine any inventory discrepancies. In other embodiments, the individual may be an auditor to determine whether a physical page matches with the digital representation of the stitched image. In other embodiments, a photo or a scan of a physical page may be compared to a stitched image to identify discrepancies between the two. In embodiments, comparison may be done by a human, and algorithm, or artificial intelligence (AI) techniques.

In some embodiments, each of the images within the stitched image may also include an inventory count, or other data associated with the image. In embodiments, the stitched image may also include other data about the physical page. In embodiments, this other data may include but is not limited to: serial numbers, a description of the item, and/or an indication of whether the image is a stock image representative example, or if the image is a scan or a photo of the exact item in the location.

In embodiments described herein, an accurate visual representation of a page that contains one or more physical objects, such as baseball cards, may be created by stitching together individual images of sides of the one or more physical objects. In this way, the visual representation of the physical page may be created without having to optically scan the entire physical page.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Various operations may be described as multiple discrete operations in turn, in a manner that is most helpful in understanding the claimed subject matter. However, the order of description should not be construed as to imply that these operations are necessarily order dependent.

As used herein, the term "module" may refer to, be part of, or include an ASIC, an electronic circuit, a processor (shared, dedicated, or group) and/or memory (shared, dedicated, or group) that execute one or more software or firmware programs, a combinational logic circuit, and/or other suitable components that provide the described functionality.

Various Figures herein may depict one or more layers of one or more package assemblies. The layers depicted herein are depicted as examples of relative positions of the layers of the different package assemblies. The layers are depicted for the purposes of explanation, and are not drawn to scale. Therefore, comparative sizes of layers should not be assumed from the Figures, and sizes, thicknesses, or dimensions may be assumed for some embodiments only where specifically indicated or discussed.

Various embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

FIG. 1 illustrates various sides, or facets, of a physical object in the form of a baseball card that may be captured and stored as digital data, for example an image, in accordance with various embodiments. FIG. 1 shows a perspective view of a card 102, which may be similar, for example, to a baseball trading card, that has a front side 102*a* and a back side 102*b* opposite the front side 102*a*. In embodiments, the card 102 may be made of paper, plastic, or of some other material. In embodiments, the card 102 may be encased in a laminate (not shown). In embodiments, the card 102 may be in a penny sleeve, card saver, top loader, a magnetic, a one touch, or some other form of plastic or glass that may be used to protect the card 102.

The card 102 may include illustrations 104 and/or text 106 that may be printed on the front side 102*a*. In embodiments, there may be other symbols on the card 102, such as QR codes (not shown), holographic images (not shown), a barcode, or an indication of radiofrequency identification (RFID) circuitry within the card, and the like that may describe other data related to the card 102. In embodiments, these other symbols may be referred to as metadata, which is described in further detail below.

Front side 108 and back side 110, respectively, are orthogonal views of the front side 102*a* and the back side 102*b* of the card 102. The front side 108 may include one or more graphics image 108*a*, which may be similar to illustration 104 of card 102, and may include text 108*b*, which may be similar to text 106 of card 102. Similarly, the back side 110 may include text 110*a*. In embodiments, the graphics image 108*a* and text 108*b*, 110*a* may include art, symbols, letters, or other markings or patterns.

Figure 2A:
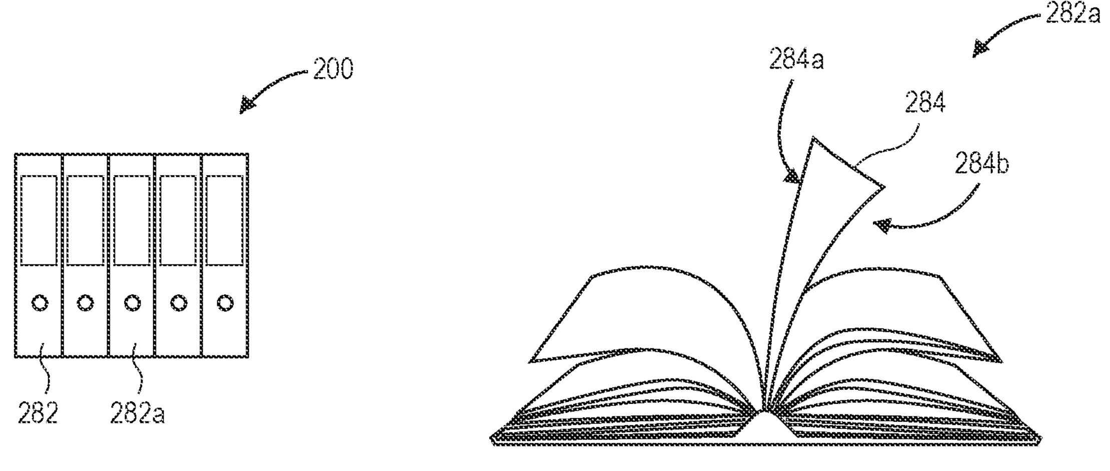
FIGS. 2A-2B illustrate a physical system for storing a plurality of physical objects, such as baseball cards, in accordance with various embodiments.

FIG. 2A illustrates a physical system for storing a plurality of physical objects, in accordance with various embodiments. Library 200 shows a number of volumes 282 that make up the library 200. The volumes 282 are shown as binders that may be on a shelf (not shown). Although the volumes 282 are shown as binders, in other embodiments the volumes 282 may be any receptacle that may be used to store physical objects as described further below.

Volume 282*a* shows a detail of an embodiment of a physical volume 282 that includes a plurality of pages that are within the volume. In embodiments, a page 284 may have a front side 284*a* and a back side 284*b*. In embodiments, a plurality of objects, for example baseball cards, may be placed within the page 284 such that a front side of the object is displayed when looking at front side 284*a* and a back side of the object is displayed when looking at back side 284*b*. In embodiments, only one side of the object may be displayed at the front side 284*a*. In embodiments, a second object may be placed on the back side 284*b*, which may be in a location corresponding to the original object, where only a side of the second object may be seen on the back side 284*b*.

Figure 2B:
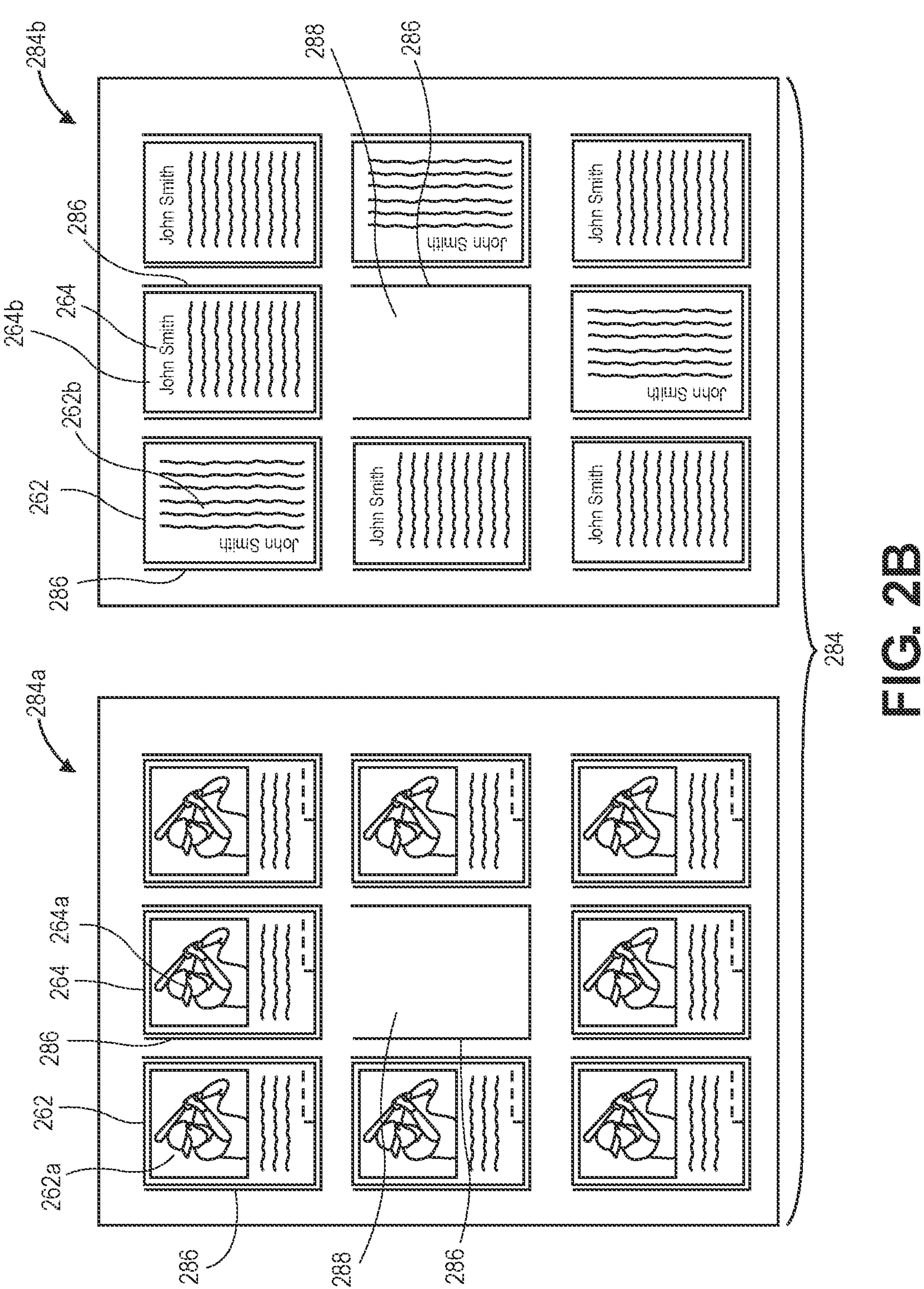

FIG. 2B illustrates front side 284*a* and back side 284*b* of page 284 in greater detail. In embodiments, the front side 284*a* may include a plurality of pockets 286, and in embodiments the back side 284*b* may include a plurality of pockets 286. The physical objects, such as baseball cards 262, 264, which may be similar to baseball card 102 of FIG. 1, may be placed in one or more of the plurality of pockets 286. In the embodiment shown, a portion of the plurality of pockets 286, when a physical object is in the pocket or may have a size that smaller than the size of the pocket, may be transparent. In other words, a viewer could look through the page 284 at the location of one of the pockets 286. In other embodiments, the pockets 286 may be accessible from only one side, for example from the front side 284*a*.

In embodiments, the pockets 286 may be a clear plastic that is attached to a side of the page 284. In other embodiments, the pockets 286 may be some other fastening mechanism, for example, but not limited to, a mechanism that may secure one or more corners of baseball cards 262, 264 to a location on the page 284. In some embodiments, the pockets 286 may be on just one side of a page 284, for example the front side 284*a*, and the back of the pockets 286 may be opaque. In some embodiments, the pockets 286 may be on both sides of a page 284, for example a first pocket on the front side 284*a* and a second pocket on the back side 284*b* opposite to the first pocket.

In embodiments, there may be multiple cards, for example card 262, in a single pocket 286. For example, this technique may be used to store inventory of multiple individual cards within the library 200. In embodiments, if all of a particular card has been removed, for example if all of the particular card has been sold to a collector, or if a card has not yet been inserted, an empty space 288 may result within the pocket 286.

In embodiments, the cards 262, 264 may have different orientations with respect to a top/side/bottom of the card. For example, card 262 may be placed in a vertical orientation with the front side 262*a* viewable in a portrait orientation with the top of the card 262 at the top edge, while the back side 262*b* may have text printed in a landscape orientation, with the top edge of the card 262 to the right of the text on the back side 262*b*. In another example, card 264 may be placed in a vertical orientation with a front side 264*a* viewable in a portrait orientation, with the back side 264*b* also in a portrait orientation, with the top of the card 264 at the top edge.

Figures 3A, 3B, 3C:
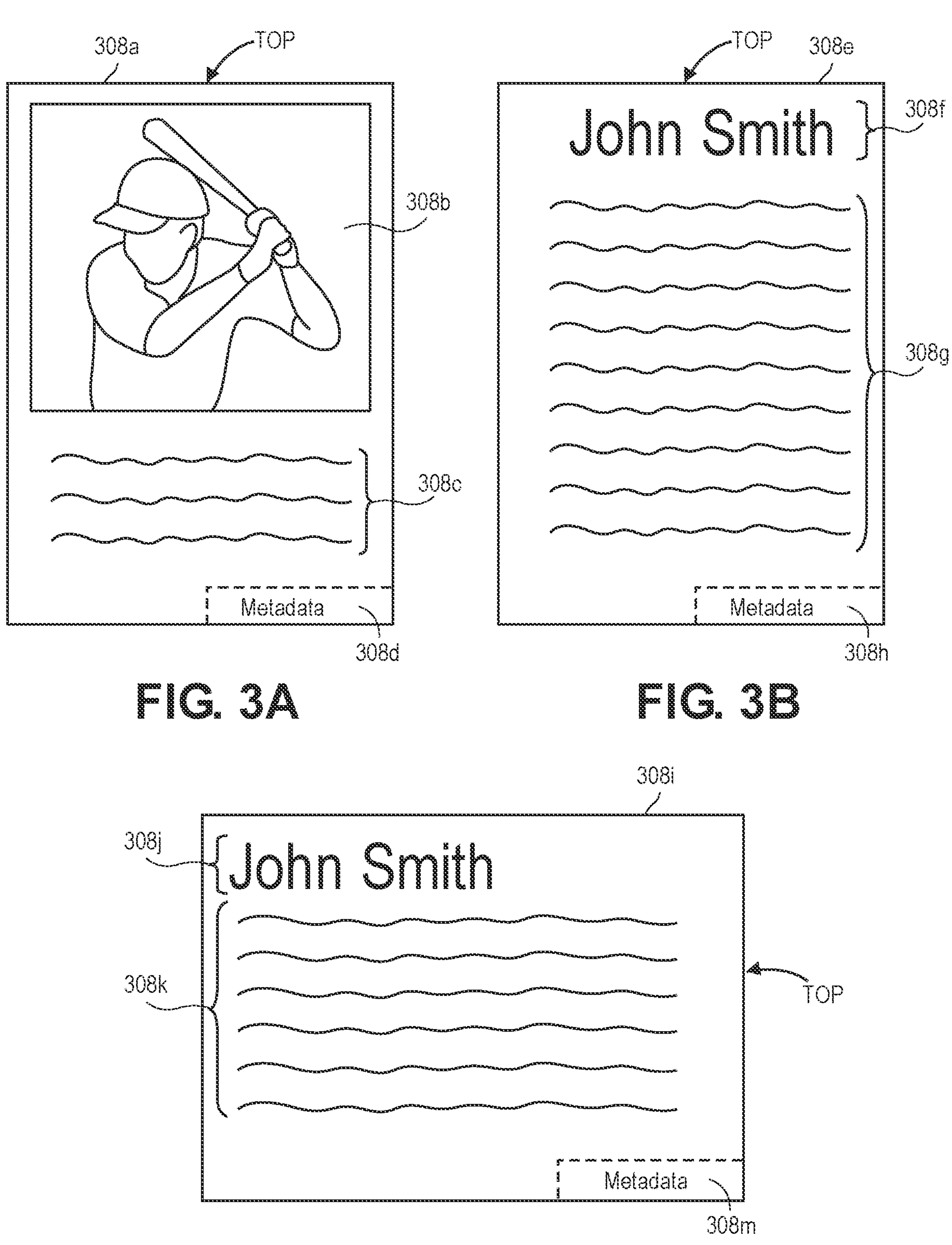
FIGS. 3A-3C illustrates various components and orientations of a digital image of one or more sides of a physical object, in accordance with various embodiments.

FIGS. 3A-3C illustrates various components and orientations of a digital image of one or more sides of a physical object, in accordance with various embodiments. FIG. 3A shows digital image 308*a*, which may be a capture of an image similar to front side 108 of FIG. 1 of a front of baseball card. In embodiments, digital image 308*a* may include one or more digital captures of a graphics image 308*b* that may be similar to graphics image 108*a* of FIG. 1, and may include one or more digital captures of a text image 308*c*. In embodiments, other visual features of the baseball card may be included in digital image 308*a*, for example graphical representation such as barcodes and/or QR codes that may contain references to other sources of data related to the baseball card.

In embodiments, the digital image 308*a* may also include metadata 308*d*. In embodiments, the metadata 308*d* may include information related to the image when the digital image 308*a* was scanned or otherwise digitally captured. In embodiments, the metadata 308*d* may be subsequently used to arrange multiple digital images 308*a* on a display or a printed page. The metadata 308*d* may include, but is not limited to, the date and time of the scan, the location at which the scan was made, the format of the scanned image, and and/or the pixel density of the image.

In embodiments, the metadata 308*d* may indicate a time at which the image was produced using photography, or may indicate that the image is a representative digital image example, but not an actual scan or photo of a physical item. In embodiments, the metadata 308*d* may include additional data that may have been discovered by searching for graphics on the card, for example but not limited to looking up information based on scanned barcodes and/or QR codes that may be printed on the physical object. In embodiments, the metadata 308*d* may indicate the number of items, for example cards 102 of FIG. 1, that may be in a physical location, such as a pocket of a page of a volume such as page 284 of volume 282*a* of FIG. 2A. The number of items may also be referred to as a quantity of items in stock.

In other embodiments, the metadata 308*d* may include information determined by an analysis of the digital image 308*a* after scanning. For example, but not limited to, one or more categories for the type of information in the digital image 308*a*, for example a baseball card or a coin, a condition of the object, for example ranging from excellent to poor, an orientation for the image, for example a top of the image, one or more locations of areas within the image and a description of the information located at those areas. In embodiments, the metadata 308*d* may be extracted for one or more of the plurality of digital images and used to identify and/or to group various digital images with each other. In embodiments, the metadata 308*d* may include a description of an item or a listing identifier ("Listing ID"). In embodiments, the listing identifier may be taken from a standardized catalog of descriptions.

In embodiments, the metadata 308*d* may include, but is not limited to: a catalog identifier, a card number, a player description, a subject description, a manufacturer identifier, a publisher identifier, a year of release, a set name, a product name, a team identification, and/or a league identification.

FIG. 3B shows digital image 308*e*, which may be similar to digital image 308*a* of FIG. 3A, however digital image 308*e* may be a capture of an image similar to back side 110 of FIG. 1 of a back of a baseball card. In embodiments, the layout of the digital image 308*e* may differ, and may include a header 308*f* and text 308*g*. In embodiments, there may be additional graphical elements similar to those described above with respect to FIG. 3A. In addition, metadata 308*h*, which may be similar to metadata 308*d* of FIG. 3A, may also be present. In embodiments, the layout of the digital image 308*e* may be in a portrait orientation, with a top of the baseball card above the header 308*f*.

FIG. 3C shows digital images 308*i*, which may be similar to digital image 308*e* of FIG. 3B, which may be a capture of an image similar to back side 110 of FIG. 1 of a back of the baseball card. In embodiments, the layout of the digital image 308*i* may differ, and may include additional graphical elements similar to those described above with respect to FIG. 3A. There may be a header 308*j* and text 308*k*, which may be similar to header 308*f* and text 308*g* of FIG. 3B. However, the layout of the digital image 308*i* may be in a landscape orientation, with a top of the baseball card to the right of the text 308*k*. Orientation information, whether portrait such as shown in digital image 308*e* or landscape such as shown in digital image 308*i* may be tracked as metadata 308*h*, 308*m*. By comparing with the metadata 308*d* of FIG. 3A, an accurate orientation of the front and a back image may be identified.

With respect to FIGS. 3A-3B, it should be appreciated that in some embodiments, the metadata 308*d*, 308*h*, 308*m* may be stored outside, respectively of the digital images 308*a*, 308*e*, 308*i*, for example in another digital file (not shown). In embodiments, the digital images 308*a*, 308*e*, 308*i* may be stored in one of a variety of graphic formats, including but not limited to a JPEG or a bitmap format.

Figure 4:
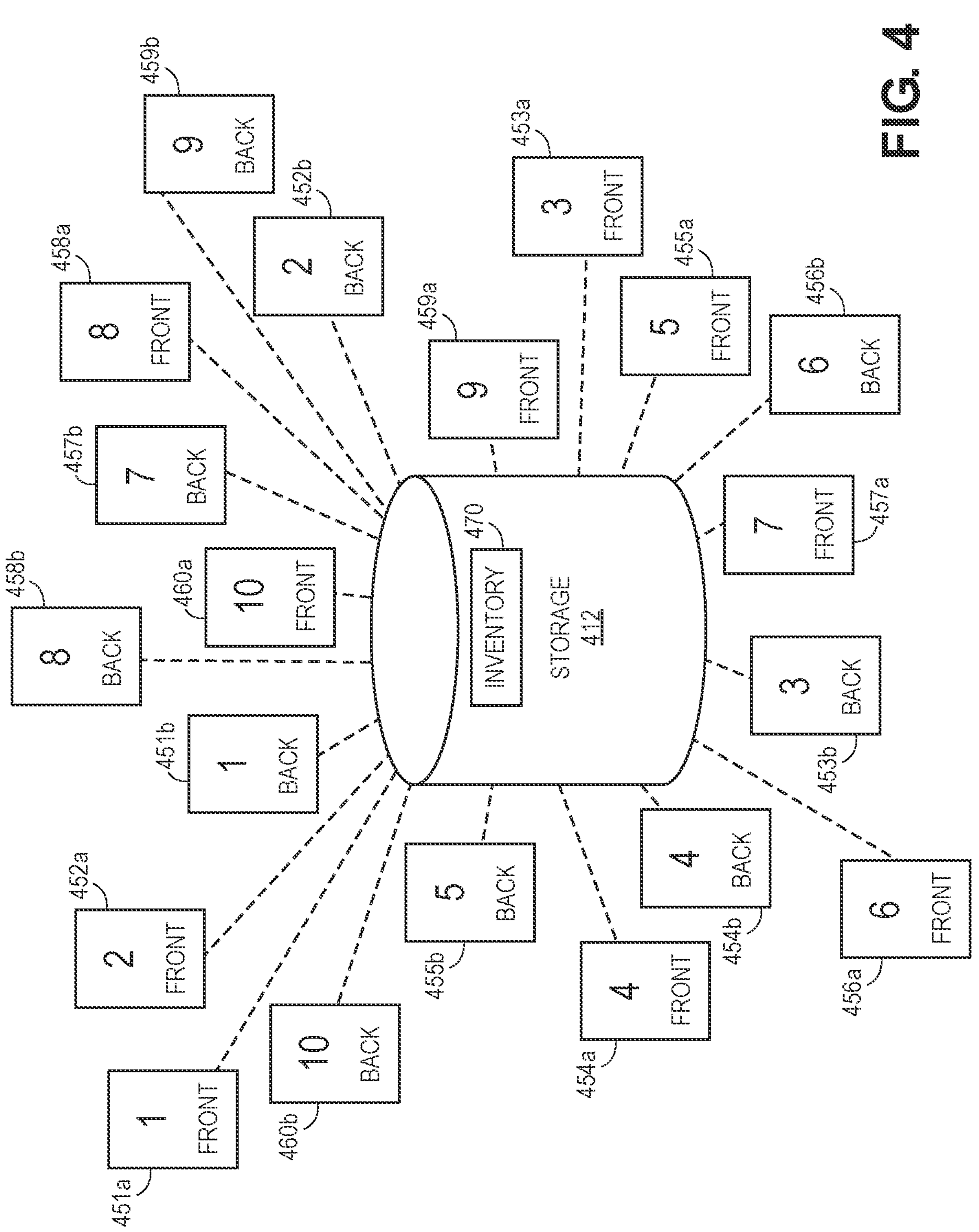
FIG. 4 illustrates a diagram of a computer-based system for storing captured digital images of sides of a plurality of physical objects, in accordance with various embodiments.

FIG. 4 illustrates a diagram of a computer-based system for storing captured digital images of sides of a plurality of physical objects, in accordance with various embodiments. In this embodiment, the front side and the back side of ten (10) physical objects, in this example baseball cards, have been scanned to create front side digital images for objects 1-10, 451*a*, 452*a*, 453*a*, 454*a*, 455*a*, 456*a*, 457*a*, 458*a*, 459*a*, 460*a*, which may be similar to digital image 308*a* of FIG. 3A. In addition, back side digital images 451*b*, 452*b*, 453*b*, 454*b*, 455*b*, 456*b*, 457*b*, 458*b*, 459*b*, 460*b* may be created, which may be similar to digital image 308*e* of FIG. 3B or may be similar to digital images 308*i* of FIG. 3C. Each of these digital images may be stored in different locations within storage device 412. In embodiments, storage device 412 may be random-access memory (RRAM), a hard disk, a solid-state hard drive, or may exist as one or more storage devices within the cloud.

In embodiments, these images may have been created using a scanner, a camera, or some other image capturing device. In embodiments, these images may have been scanned from a page onto which multiple cards may have been placed, for example, from a volume 282 of library 200 shown in FIG. 2A.

In addition, storage device 412 may include an inventory 470. In embodiments, the inventory 470 may include various inventory levels of physical items that are represented by the images. For example, the quantity of baseball cards that are physically on hand that are associated with the front digital image 452*a* and the back digital image 452*b*. In embodiments, the inventory 470 may also include physical locations, for example a physical address or a volume/page number, where the physical item is located. In this way, in embodiments, information in storage device 412 may be used to identify a digital image representation of a physical item, the number of physical items in stock, and the location at which the physical items may be found.

Figure 5B:
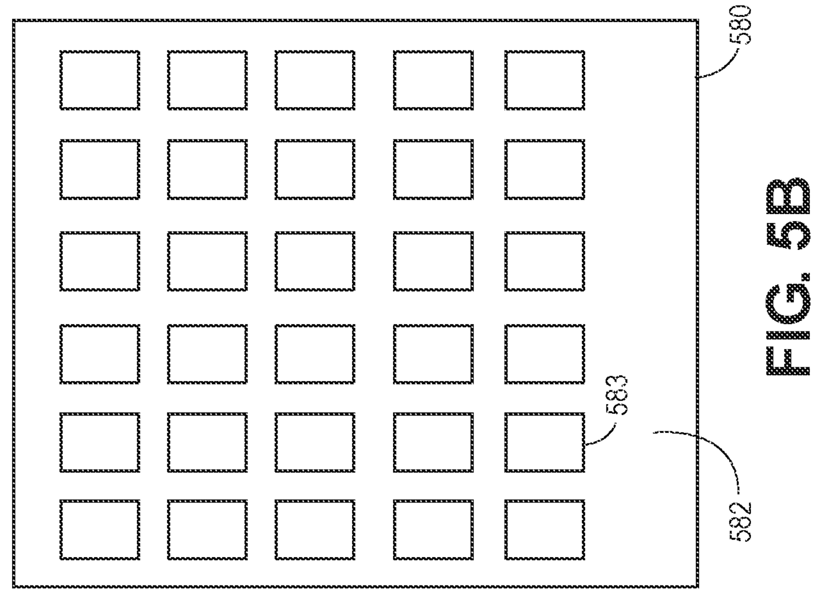
FIGS. 5A-5B illustrate graphical images that include a plurality of images of sides of a plurality of physical objects that are stitched together, in accordance with various embodiments.
Figure 5A:
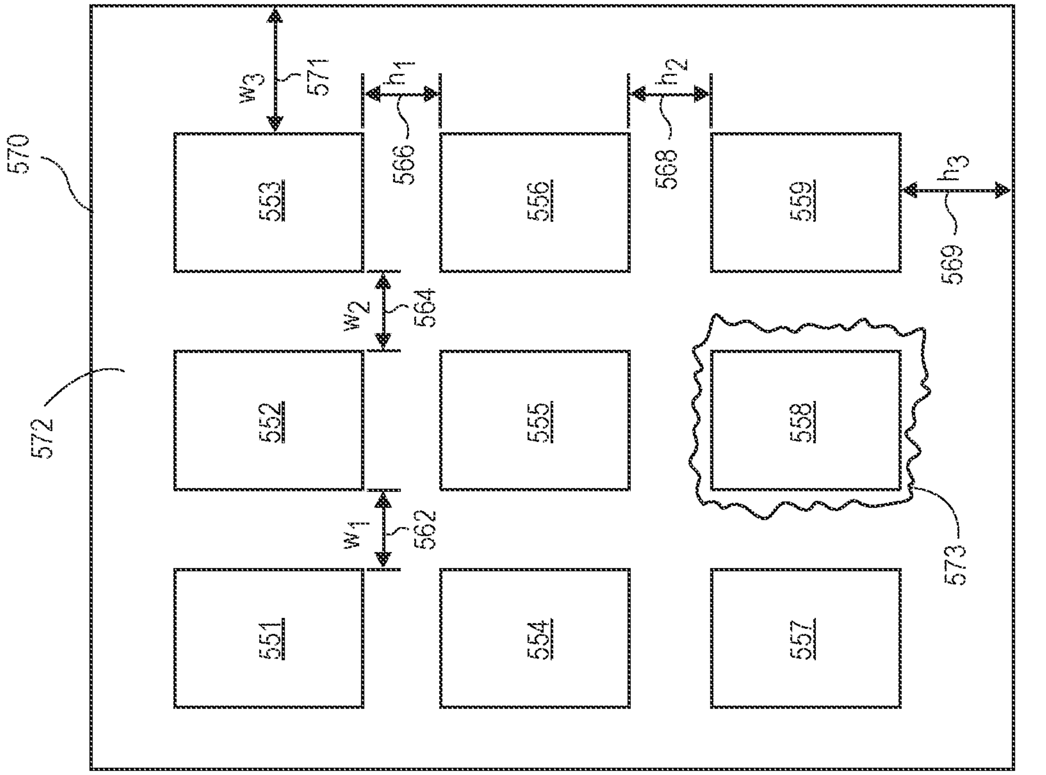

FIGS. 5A-5B illustrate graphical images that include a plurality of images of sides of the plurality of physical objects that are stitched together, in accordance with various embodiments. FIG. 5A illustrates a 2D arrangement of a plurality of digital images 551-559 that may be used to create a graphics image 570. In embodiments, the plurality of digital images 551-559 may be placed within a background image 572. In embodiments, the background image 572 may be of any color or pattern. In embodiments, the background image 572 may be selected to highlight, for example but not limited to surrounding in a frame, one or more of the plurality of digital images 551-559.

In embodiments, the plurality of digital images 551-559 may have been selected from the front side digital images 451*a*, 452*a*, 453*a*, 454*a*, 455*a*, 456*a*, 457*a*, 458*a*, 459*a*, 460*a*, and/or the back side digital images 451*b*, 452*b*, 453*b*, 454*b*, 455*b*, 456*b*, 457*b*, 458*b*, 459*b*, 460*b* of FIG. 4. In embodiments, this 2D arrangement process to create the graphics image 570 may be referred to as "stitching" or "image stitching."

In embodiments, one or more of the plurality of digital images 551-559 may have been selected by a user (not shown) who may select the particular image, the orientation of the image, and/or the location of the image within the graphics image 570. In embodiments, one or more of the digital images 551-559 may be placed in the graphics image 570 based upon examination and/or processing of metadata for the digital image, such as metadata 308*d* of FIG. 3A.

In embodiments, the plurality of digital images 551-559 may be arranged based upon a physical arrangement of physical items associated with the plurality of digital images 551-559. In embodiments, the arrangement of the plurality of digital images 551-559 may be based upon the contents of the inventory 470 within the storage device 412 of FIG. 4. For example, a physical location of a physical object, such as a baseball card, may be found within library 200, volume 282*a*, and page 284 within the volume 282*a*, in the upper left-hand corner of the page 284. As a result, digital image 551 may be displayed in the upper left and corner of the page 284, provided that there are one or more baseball cards associated with digital image 551 in inventory 470. If there is no physical item shown in the inventory 470, for example in the center slot of the graphics image 570 the position of digital image 555 would not be shown, In embodiments, this technique may be used to create a graphics image 570 that visually represents what a current physical page of a volume 282 should look like. In embodiments, the graphics image 570 may be given to an individual who works in a warehouse as a picker, where the background image 572 may form a highlight 573 around the digital image 558, to indicate the corresponding baseball card that should be selected from inventory. In embodiments, the graphics image 570 may be given to an individual to verify the physical inventory in a warehouse, by showing what a particular page should look like according to the inventory 470.

In embodiments, the background image 572 may include annotations (not shown) proximate to one or more of the digital images 551-559. These annotations may include the number of baseball cards that should be within a pocket on the page, which may be similar to pocket 286 of FIG. 2B. In embodiments, the annotations may be a number of baseball cards that should be selected, or picked, from the pocket.

In embodiments, the placement of the plurality of digital images 551-559 may also include horizontal separation between the images, for example a first width W1 562 between two columns and a second width W2 564 between two other columns. In embodiments, a third width W3 571 may specify a margin between a last column of digital images and an edge of the graphics image 570. Similarly, the placement of the plurality of digital images 551-559 may include a vertical separation between the images, for example a first height h1 566 between two rows of the digital images and a second height h2 568 between two other rows of digital images. In embodiments a third height h3 569 may specify a margin between a last row of digital images and an edge of the graphics image 570. In embodiments, relative or absolute locations for each item may be identified, without any specific margins for the graphics image 570.

It should be appreciated that the horizontal and vertical separations between digital images that are adjacent to each other described herein may be varied throughout the entire graphics image 570. In embodiments where the plurality of digital images 551-559 are other than a rectangular shape, for example an irregular shape, circular shape, or some other shape, the distances between the respective digital images, or between a digital image and an edge of the graphics image 570 may be varied.

In embodiments, the plurality of digital images 551-559 may be presented in a grid format, which may include but not limited to a 1×2, 1×3, 2×2, 2×3, 2×4, 2×5, 3×3, 3×4, 3×5, 4×4, 4×5, or 5×5 grid format or grid configuration. Other layouts may be used that are different than a grid format, for example a hexagonal layout system (not shown) or some other regular or irregular layout system. In embodiments, one or more of the plurality of digital images 551-559 may be rotated, or otherwise adjusted so that all of the plurality of digital images 551-559 are aligned in a particular direction. In some embodiments, a grid may not be used, for example a configuration that has a first row of a first number of elements and a second row of a second number of elements different than the first number. For example, a first row of one and a second row of two.

In some embodiments, each of the plurality of digital images 551-559 may not overlap each other, as shown in FIG. 5A. In other embodiments, one or more of the plurality of digital images 551-559 may overlap each other.

FIG. 5B illustrates another 2D arrangement of a plurality of digital images 583, which may be similar to plurality of digital images 551-559 of FIG. 5A, which may be placed at a higher density, specifically a 6×5 array, on a background image 582 to create graphics image 580, which may be similar to graphics image 570.

Figure 6A:
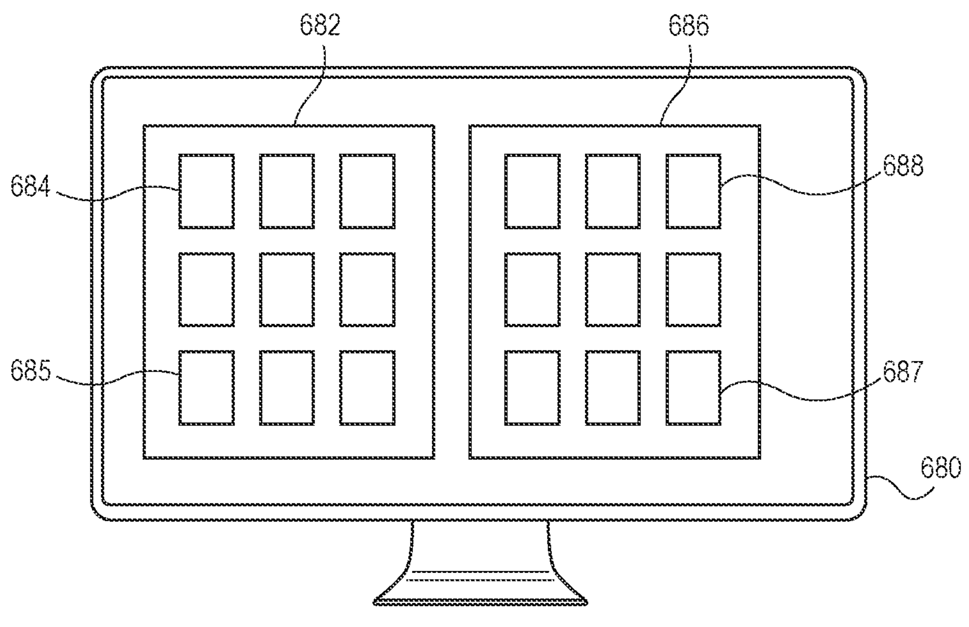
FIGS. 6A-6B illustrate examples of a graphical image that includes a plurality of images of sides of the plurality of physical objects that are stitched together on a computer display or a sheet of paper, in accordance with various embodiments.
Figure 6B:
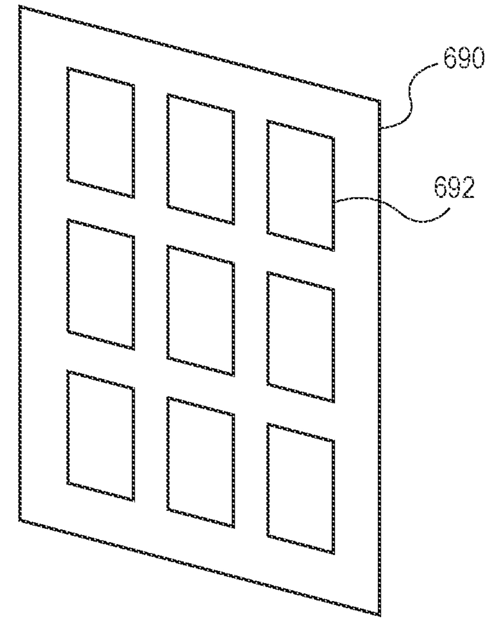

FIGS. 6A-6B illustrate examples of a graphical image that includes a plurality of images of sides of the plurality of physical objects that are stitched together on a computer display or a sheet of paper, in accordance with various embodiments.

FIG. 6A shows a computer display 680 that is displaying to graphics images 682, 686, which may be similar to graphics image 570 of FIG. 5A, or graphics image 580 of FIG. 5B. Individual digital images 684, 688, which may be similar to digital images 551-559 of FIG. 5A, may be arranged, respectively, within the graphics image as 682, 686.

In embodiments, the display 680 is able to show a page of digital images of sides of cards, for example baseball cards, as they may appear if each physical card were placed in a pocket. In embodiments, the graphics image 682 may represent the front side of a subset of the plurality of cards, and the graphics image 686 may represent the back side of the subset of the plurality of cards. In embodiments, the graphics images 682, 686 may be preview screens prior to the printing of a double-sided page. In these embodiments, the graphics image 685 may represent the front side of a baseball card, and the graphics image 687 may represent the back side of a baseball card. Thus, after printing, the graphics image 685 may align with the graphics image 687.

Figure 8:
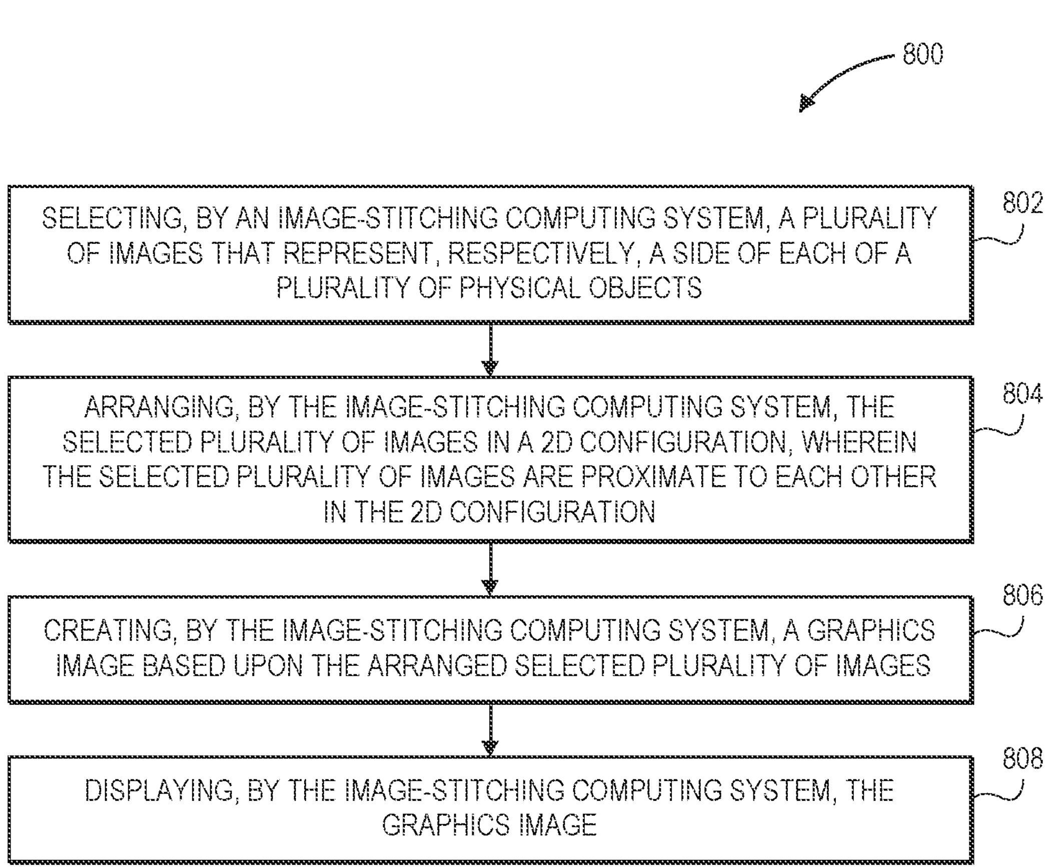
FIG. 8 illustrates an example process for creating 2D arrangements of captured digital images of sides of the plurality of physical objects, which may be referred to as stitching, in accordance with various embodiments.

It should be appreciated that the display 680 may be connected with a computing device, such as that as shown with respect to FIG. 8, or the display 680 may show the results of opening email or some other file that may be sent to another user at a remote location. In embodiments, the display 680 may be a preview screen prior to a printing operation.

FIG. 6B illustrates an example of a paper document 690, where the individual digital images 692, which may be similar to individual images 684, 688 of FIG. 6A, may have been printed. In embodiments, one or more of the digital images 692 may correspond with a pocket 286 of FIG. 2B. In these embodiments, one or more of the digital images 692 may be left blank, or may have an overlay image indicating that the item corresponding with pocket 286 of FIG. 2B may no longer be available.

Figure 7:
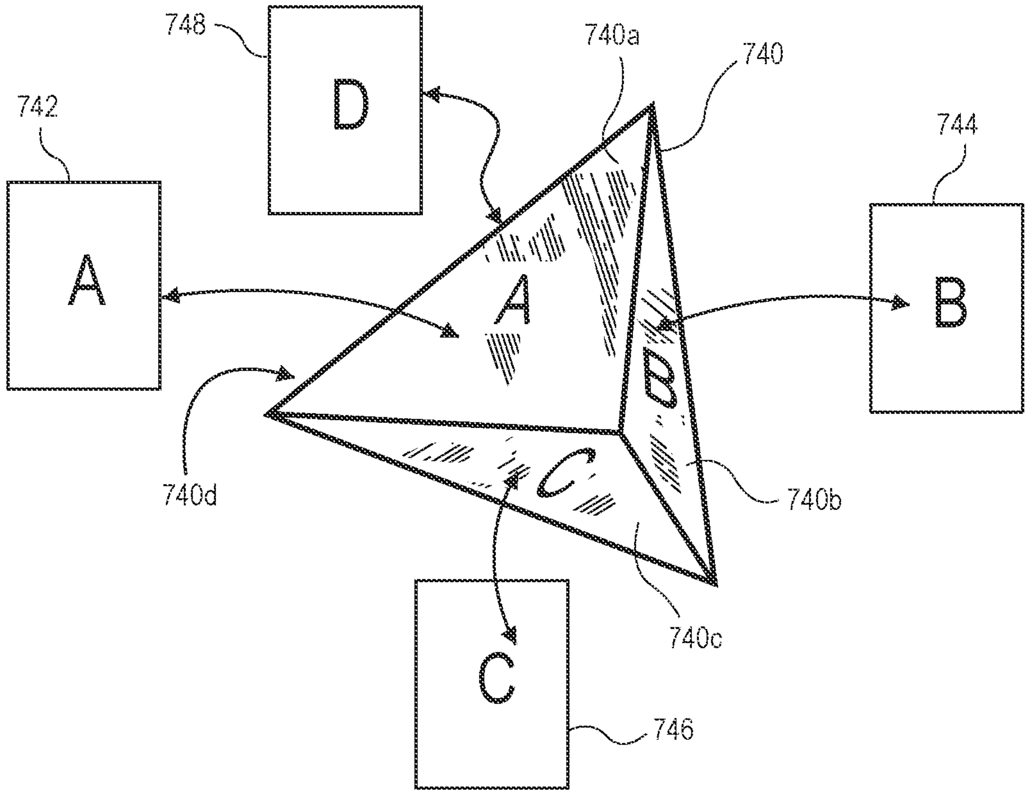
FIG. 7 illustrates an object that has more than two sides, or facets, with images captured for each facet, in accordance with various embodiments.

FIG. 7 illustrates an object that has more than two sides, or facets, with images captured for each facet, in accordance with various embodiments. FIG. 7 shows a perspective view of a general three-dimensional physical object 740, that may include sides, or facets, A 740*a*, B 740*b*, C 740*c* and D 740*d*. In embodiments, images may be acquired of each of the sides of the three-dimensional physical object 740, in particular an image of side A 742, an image of side B 744, an image of side C 746, and an image of side D 748. In embodiments, images of each of the sides 742, 744, 746, 748, which may be similar to front side 108 or back side 110 of FIG. 1, and may be stored in a graphics format or in an electronic document format, as described above.

FIG. 8 illustrates an example process for creating 2D arrangements of captured digital images of sides of the plurality of physical objects, which may be referred to as stitching, in accordance with various embodiments.

At block 802, the process may include selecting, by an image-stitching computing system, a plurality of images that represent, respectively, a side of each of a plurality of physical objects. In embodiments, the plurality of images may be similar to digital image 308*a* of FIG. 3A, digital image 308*e* of FIG. 3B, digital image 308*i* of FIG. 3C, digital images 451*a*, 452*a*, 453*a*, 454*a*, 455*a*, 456*a*, 457*a*, 458*a*, 459*a*, 460*a*, 451*b*, 452*b*, 453*b*, 454*b*, 455*b*, 456*b*, 457*b*, 458*b*, 459*b*, 460*b* of FIG. 4, digital images 551-559 of FIG. 5A, digital image 582 of FIG. 5B, digital images 684, 685, 687, 688 of FIG. 6A, or images 742, 744, 746, 748 of FIG. 7 In embodiments, the physical objects may be similar to card 102 of FIG. 1, or three dimensional physical object 740 of FIG. 7.

At block 804, the process may further include arranging, by the image-stitching computing system, the selected plurality of images in a 2D configuration, wherein the selected plurality of images are proximate to each other in the 2D configuration. In embodiments, the selected plurality of images in a 2D configuration, may be similar to the digital images 551-559 of FIG. 5A, digital images 583 of FIG. 5B, or digital images 684, 685, 687, 688 of FIG. 6A.

At block 806, the process may further include creating, by the image-stitching computing system, a graphics image based upon the arranged selected plurality of images. In embodiments, the graphics image may be similar to graphics images 570 of FIG. 5A, graphics image 580 of FIG. 5B, or graphics images 682, 686 of FIG. 6A.

At block 808, the process may further include displaying, by the image-stitching computing system, the graphics image. In embodiments, the displaying may be performed on a device similar to display 680 of FIG. 6A. In embodiments, the displaying may be performed on the paper document 690.

Figure 9:
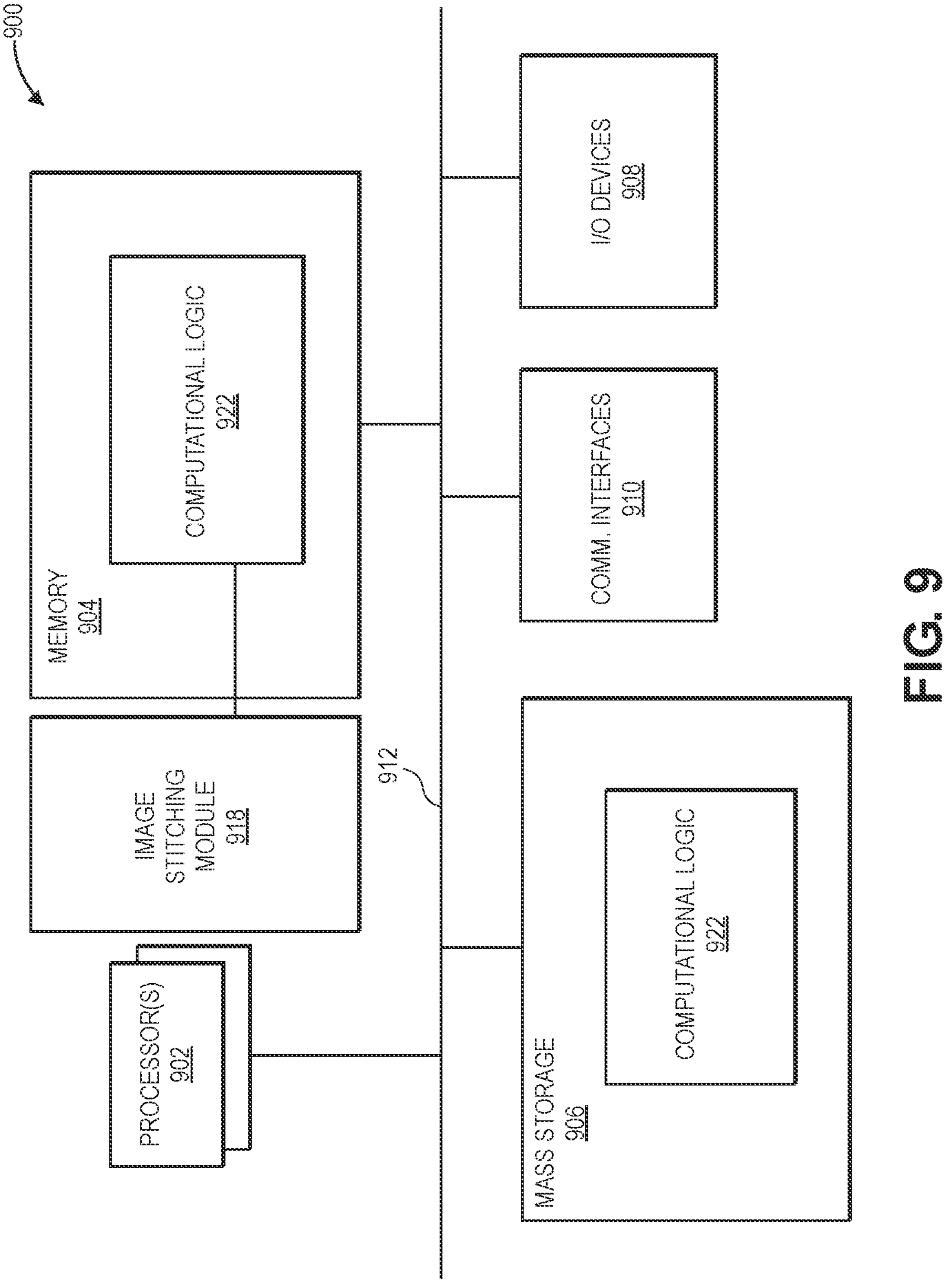
FIG. 9 schematically illustrates a computing device, in accordance with embodiments.

FIG. 9 illustrates an example computing device 900 suitable for use to practice aspects of the present disclosure, in accordance with various embodiments. For example, the example computing device 900 may be suitable to implement the functionalities of the process 800. In some embodiments, the example computing device 900 may be suitable to implement the functionalities of user devices, for example but not limited to display 680 of FIG. 6A.

As shown, computing device 900 may include one or more processors or processor cores 902, and system memory 904. For the purpose of this application, including the claims, the term "processor" refers to a physical processor, and the terms "processor" and "processor cores" may be considered synonymous, unless the context clearly requires otherwise. The processor 902 may include any type of processors, such as a central processing unit (CPU), a microprocessor, and the like. The processor 902 may be implemented as an integrated circuit having multi-cores, e.g., a multi-core microprocessor. The computing device 900 may include mass storage devices 906 (such as diskette, hard drive, volatile memory (e.g., dynamic random access memory (DRAM)), compact disc read only memory (CD-ROM), digital versatile disk (DVD) and so forth). In general, system memory 904 and/or mass storage devices 906 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computing device 900 may further include input/output (I/O) devices 908 such as a display, keyboard, cursor control, remote control, gaming controller, image capture device, and so forth and communication interfaces (comm. INTF) 910 (such as network interface cards, modems, infrared receivers, radio receivers (e.g., Bluetooth), and so forth). I/O devices 908 may be suitable for communicative connections with user devices such as input devices, keyboards, or displays.

The communication interfaces 910 may include communication chips (not shown) that may be configured to operate the device 900 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 910 may operate in accordance with other wireless protocols in other embodiments.

The above-described computing device 900 elements may be coupled to each other via system bus 912, which may represent one or more buses. In the case of multiple buses, they may be bridged by one or more bus bridges (not shown). Each of these elements may perform its conventional functions known in the art. In particular, system memory 904 and mass storage devices 906 may be employed to store a working copy and a permanent copy of the programming instructions implementing the operations associated processes described herein, e.g., operations associated with providing image stitching module 918 as described in reference to FIGS. 1-8 (e.g. when device 900 is used to implement process 800) or operations associated with other system interactions, generally shown as computational logic 922. Computational logic 922 may be implemented by assembler instructions supported by processor(s) 902 or high-level languages that may be compiled into such instructions.

The permanent copy of the programming instructions may be placed into mass storage devices 906 in the factory, or in the field, through, for example, a distribution medium (not shown), such as a compact disc (CD), or through communication interfaces 910 (from a distribution server (not shown)).

FIG. 10 illustrates an example non-transitory computer-readable storage media 1002 having instructions configured to practice all or selected ones of the operations associated with the processes described above. As illustrated, non-transitory computer-readable storage medium 1002 may include a number of programming instructions 1004 (e.g., including image stitching module 918). Programming instructions 1004 may be configured to enable a device, e.g., computing device 800, in response to execution of the programming instructions, to perform one or more operations of the processes described in reference to FIGS. 1-8. In alternate embodiments, programming instructions 1004 may be disposed on multiple non-transitory computer-readable storage media 1002 instead. In still other embodiments, programming instructions 1004 may be encoded in transitory computer-readable signals.

Referring again to FIG. 9, the number, capability, and/or capacity of the elements 908, 910, 912 may vary, depending on which processes described herein are being executed, and whether computing device 900 is a stationary computing device, such as a set-top box or desktop computer, or a mobile computing device, such as a tablet computing device, laptop computer, game console, or smartphone. Their constitutions are otherwise known, and accordingly will not be further described.

At least one of processors 902 may be packaged together with memory having computational logic 922 configured to practice aspects of embodiments described in reference to FIGS. 1-8. For one embodiment, at least one of the processors 902 may be packaged together with memory having computational logic 922 configured to practice aspects of process 800 of FIG. 8 to form a System in Package (SiP) or a System on Chip (SoC).

In various implementations, the computing device 900 when used to implement processes described herein may comprise a stand-alone server or a server of a computing rack or cluster; or the computing device 900 may comprise a laptop, a netbook, a notebook, an ultrabook, a smartphone, a tablet, a personal digital assistant (PDA), an ultra-mobile PC, a mobile phone, a desktop computer, a monitor, a set-top box, or an entertainment control unit. In further implementations, the computing device 900 may be any other electronic device that processes data.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or to limit embodiments to the precise forms disclosed. While specific embodiments are described herein for illustrative purposes, various equivalent modifications are possible within the scope of the embodiments, as those skilled in the relevant art will recognize.

These modifications may be made to the embodiments in light of the above detailed description. The terms used in the following claims should not be construed to limit the embodiments to the specific implementations disclosed in the specification and the claims. Rather, the scope of the invention is to be determined entirely by the following claims, which are to be construed in accordance with established doctrines of claim interpretation.

EXAMPLES

The following paragraphs describe examples of various embodiments.

Example 1 is a non-transitory computer-readable medium that comprises instructions that, when executed by a processor associated with a computer, are to: select a plurality of images that represent, respectively, a side of each of a plurality of physical objects; identify a background image; create a page image by arranging the selected plurality of images on the background image, wherein the selected plurality of images are proximate to each other; and display the page image.

Example 2 includes the non-transitory computer readable medium of example 1, wherein arranging the selected plurality of images on the background image further includes arranging the selected plurality of images in a grid formation.

Example 3 includes the non-transitory computer readable medium of example 2, wherein the grid formation is a selected one of a: 1×2, 1×3, 2×2, 2×3, 2×4, 2×5, 3×3, 3×4, 3×5, 4×4, 4×5, or 5×5 grid.

Example 4 includes the non-transitory computer-readable medium of examples 1, 2, or 3, wherein arranging the selected plurality of images further includes rotating at least some of the selected plurality of images so that the selected plurality of images have a same orientation with respect to each other.

Example 5 includes the non-transitory computer readable medium of examples 1, 2, 3, or 4, wherein at least some of the plurality of images are in a selected one of: a JPEG format, a PNG format, a GIF format, a raw format, an ICO format, or a bitmap format.

Example 6 includes the non-transitory computer readable medium of examples 1, 2, 3, 4, or 5, wherein to display the page image further includes a selected one or more of: print the page image on a device that is associated with the computer, display the page image on a display device that is associated with the computer, or store the page image in a file on a storage medium that is associated with the computer.

Example 7 includes the non-transitory computer readable medium of example 6, wherein a format of the file on the storage medium is a selected one or more of: a JPEG or a bitmap format.

Example 8 includes the non-transitory computer readable medium of examples 1, 2, 3, 4, 5, 6, or 7, wherein the plurality of images are a first plurality of images, wherein the side is a first side, wherein the page image is a first page image, and wherein the background image is a first background image; and wherein the instructions are further to: select a second plurality of images that represent, respectively, a second side of each of the plurality of physical objects; arrange the selected second plurality of images in a plane, wherein none of the selected second plurality of images overlap with each other; create a second graphics image based upon the arranged selected second plurality of images; and store the second graphics image to a file on a storage medium associated with the computer.

Example 9 includes the non-transitory computer readable medium of example 8, wherein to arrange the selected second plurality of images is further to arrange the selected second plurality of images corresponding to an arrangement of the first plurality of images.

Example 10 includes the non-transitory computer readable medium of examples 8 or 9, wherein the physical objects are a plurality of cards, wherein the first plurality of images includes a front side, respectively, of the plurality of cards, and wherein the second plurality of images includes a back side, respectively, of the plurality of cards.

Example 11 includes the non-transitory computer readable medium of examples 1, 2, 3, 4, 5, 6, 7, 8, 9, or 10, wherein none of the selected plurality of images overlap each other.

Example 12 includes the non-transitory computer readable medium of examples 1, 2, 3, 4, 5, 6, 7, 8, 9, 10, or 11, wherein arranging the selected plurality of images further includes to: display, on a display device associated with the computer, one or more of the plurality of images to a user; and receive an indication from the user of a location of the one or more of the plurality of images.

Example 13 includes the non-transitory computer readable medium of examples 1, 2, 3, 4, 5, 6, 7, 8, 9, 10, 11, or 12, wherein arranging the selected plurality of images further includes to: identify, for at least some of the plurality of images, metadata associated with each of the at least some of the plurality of images; and based upon the identified metadata, arrange the at least some of the plurality of images.

Example 14 includes the non-transitory computer-readable medium of example 13, wherein the metadata includes a selected one or more of: a catalog identifier, a card number, a player description, a subject description, a manufacturer identifier, a publisher identifier, a year of release, a set name, a product name, a team identification, and/or a league identification.

Example 15 includes the non-transitory computer-readable medium of examples 1, 2, 3, 4, 5, 6, 7, 8, 9, 10, 11, 12, 13, or 14, wherein arranging the selected plurality of images further includes to separate the selected plurality of images that are adjacent to each other by a fixed distance.

Example 16 includes the non-transitory computer-readable medium of example 15, wherein the fixed distance is determined by a selected one or more of: a number of pixels, a number of inches, a number of centimeters, a number of millimeters, a number of points, or a percentage value.

Example 17 is a computer-based method comprising: selecting, by an image-stitching computing system, a plurality of images that represent, respectively, a side of each of a plurality of physical objects; arranging, by the image-stitching computing system, the selected plurality of images in a two-dimensional (2D) configuration, wherein the selected plurality of images are proximate to each other in the 2D configuration; creating, by the image-stitching computing system, a graphics image based upon the arranged selected plurality of images; and displaying, by the image-stitching computing system, the graphics image.

Example 18 includes the computer-based method of example 17, wherein arranging, by the image-stitching computing system, further includes: extracting, by the image-stitching computing system, metadata from each of one or more of the selected plurality of images; and arranging, by the image-stitching computing system, the selected plurality of images in a 2D configuration based at least in part on the extracted metadata.

Example 19 is a computing apparatus, comprising: a processor; a memory coupled with the processor, wherein the memory includes computer executable instructions; and wherein the computer executable instructions, when executed by the processor, cause the computer to: select a plurality of images that represent, respectively, a side of each of a plurality of physical objects; arrange the selected plurality of images in a two-dimensional (2D) configuration, wherein the selected plurality of images are proximate to each other in the 2D configuration; and create a graphics image based upon the arranged selected plurality of images.

Example 20 includes the computing apparatus of example 19, wherein the plurality of images are images of a side of a baseball card.

Example 21 is an apparatus comprising means to perform one or more elements of a method or process described in or related to any example, embodiment, or portions or parts thereof described herein.

Example 22 is one or more non-transitory computer-readable media comprising instructions to cause an electronic device, upon execution of the instructions by one or more processors of the electronic device, to perform one or more elements of a method or a process described in or related to any example, embodiment, or portions or parts thereof described herein.

Example 23 is an apparatus comprising logic, modules, or circuitry to perform one or more elements of a method described in or related to any example, embodiment, or portions or parts thereof described herein.

Example 24 is a method, technique, or process as described in or related to any example, embodiment, or portions or parts thereof described herein.

Example 25 is an apparatus comprising: one or more processors and one or more computer-readable media comprising instructions that, when executed by the one or more processors, cause the one or more processors to perform the method, techniques, or process as described in or related to any example, embodiment, or portions or parts thereof described herein.

Example 26 is a system for providing image stitching as shown and/or described herein.

Example 27 is a device for providing image stitching as shown and/or described herein.

What is claimed is:

1. A non-transitory computer-readable medium that comprises instructions that, when executed by a processor are configured to cause the processor to:

capture individual images of cards associated with a page of cards via at least one of a photograph or an optical scan, wherein different storage locations of the page are associated with different cards of the page of cards;

store the individual images, and for each individual image, a respective listing identifier and respective location information, in one or more databases, wherein for each individual image, the respective location information associates the individual image with the page and a respective one of the different storage locations of the page;

access the one or more databases with a selected one of the respective listing identifiers to retrieve a selected one of the individual images, remaining individual images of the page, and the respective location information of each of the individual images; and based on the accessing, display a page image on a display device by arranging each of the individual images on a background image, wherein the background image highlights the selected one of the individual images, and the individual images are arranged on the page image in positions corresponding to the different storage locations of the page based on the respective location information.

2. The non-transitory computer-readable medium of claim 1, wherein:

the storage locations of the page are arranged in a grid formation; and the individual images are arranged in the page image according to the grid formation.

3. The non-transitory computer-readable medium of claim 1, wherein the instructions, when executed by the processor are configured to cause the processor to, for at least one of the individual images:

store respective metadata indicating a desired orientation of the individual image in the page image.

4. The non-transitory computer-readable medium of claim 1, wherein the individual images of the cards are individual front side images, and the instructions, when executed by the processor are configured to cause the processor to:

capture individual back-side images of the cards via at least one of a photograph or an optical scan; and store the individual back-side images, and for each individual back-side image, the respective listing identifier and respective back-side location information, in the one or more databases, wherein for each individual back-side image, the respective back-side location information associates the individual back-side image with the back-side of the page and a respective one of the different storage locations of the page.

5. The non-transitory computer-readable medium of claim 4, wherein the instructions, when executed by the processor are configured to cause the processor to:

access the one or more databases with the selected one of the respective listing identifiers to retrieve a selected one of the individual back-side images, remaining individual back-side images of the page, and the respective back-side location information of each of the individual back-side images; and display an additional page image on the display device by arranging each of the individual back-side images on the additional page image in positions corresponding to the different storage locations of the page based on the respective back-side location information.

6. The non-transitory computer-readable medium of claim 1, wherein the instructions, when executed by the processor are configured to cause the processor to, for at least one of the individual images:

display, on the display device, the at least one of the individual images; and receive the respective location information of the at least one of the individual images via a user input device.

7. The non-transitory computer-readable medium of claim 1, wherein the instructions, when executed by the processor are configured to cause the processor to, for at least one of the individual images:

store respective metadata comprising at least one of: a catalog identifier, a card number, a player description, a subject description, a manufacturer identifier, a publisher identifier, a year of release, a set name, a product name, a team identification, or a league identification.

8. A computer-based method, comprising, at an image-stitching computing system:

accessing one or more databases comprising respective individual images of physical objects using a listing identifier of a selected individual image among the respective individual images, wherein for each page of a set of pages, the physical objects are to be stored in a respective order on the page;

identifying one of the pages of the set of pages based on the accessing and the listing identifier;

selecting a subset of the respective individual images that are associated with the one of the pages; and displaying a graphics image comprising the subset of the respective individual images arranged in a grid order corresponding to the respective order of the one of the pages in which the physical objects are to be stored.

9. The computer-based method of claim 8, further comprising, at the image-stitching computing system:

accessing, from the one or more databases, metadata of the subset of the respective individual images; and determining the grid order based on the metadata.

10. A computing apparatus, comprising:

a processor; and a memory coupled with the processor, wherein the memory comprises computer executable instructions that, when executed by the processor, are configured to cause the processor to:

select from one or more databases, a plurality of images that represent, respectively, a side of each of a plurality of physical objects of a collection, wherein the physical objects are to be stored in respective locations of respective pages;

display, on a display device, the plurality of images of one of the respective pages in a two-dimensional (2D) configuration;

receive respective location information for each of the displayed images via a user input device, wherein, for each displayed image, the location information includes an identifier of one of the respective pages and an identifier of one of the respective locations in the one of the respective pages;

store, in the one or more databases, the respective location information;

receive an identifier of a selected image of the one or more databases;

based on the identifier of the selected image, identify the one of the respective pages and the one of the respective locations in the one of the respective pages, and retrieve the selected image and remaining images of the plurality of images that are associated with one of the respective pages; and display the selected image and the remaining images on the display device in locations on the display device corresponding to the respective locations in the one of the respective pages.

11. The computing apparatus of claim 10, wherein the physical objects are sports cards.

12. The non-transitory computer-readable medium of claim 1, wherein the instructions, when executed by the processor are configured to cause the processor to:

access the one or more databases with the selected one of the respective listing identifiers to retrieve an inventory count of an associated one of the cards; and display the inventory count on the page image.

13. The non-transitory computer-readable medium of claim 1, wherein the page image is displayed without optically scanning or photographing an entirety of the page of cards.

14. The non-transitory computer-readable medium of claim 1, wherein the instructions, when executed by the processor are configured to cause the processor to, for at least one of the cards:

capture individual images search for at least one of a barcode or a QR code printed on the card;

look up information based on the at least one of the barcode or the QR code; and store the information as respective metadata of the individual image of the card in the one or more databases.

15. The non-transitory computer-readable medium of claim 1, wherein the instructions, when executed by the processor are configured to cause the processor to, for at least one of the cards:

analyze the individual image of the card to identify a condition of the card; and store information indicative of the condition as respective metadata of the individual image of the card in the one or more databases.

16. The non-transitory computer-readable medium of claim 1, wherein the instructions, when executed by the processor are configured to cause the processor to, for at least one of the cards:

analyze the individual image to determine that the card comprises radio frequency identification (RFID) circuitry;

obtain information regarding the card from the RFID circuitry; and store the information as respective metadata of the individual image of the card in the one or more databases.

17. The non-transitory computer-readable medium of claim 1, wherein the instructions, when executed by the processor are configured to cause the processor to, for at least one of the cards:

analyze the individual image to determine that the card comprises a holographic image;

obtain information regarding the card from the holographic image; and store the information as respective metadata of the individual image of the card in the one or more databases.

18. The non-transitory computer-readable medium of claim 1, wherein the accessing of the one or more databases is performed as part of at least one of an order fulfillment process, an auditing process or an inventorying process involving the selected card.

19. The computer-based method of claim 8, further comprising highlighting, by the image-stitching computing system, in the graphics image, the selected individual image.

20. The computing apparatus of claim 10, wherein the instructions, when executed by the processor, are configured to cause the processor to highlight the selected image to distinguish it from the remaining images.

* * * * *